(12) United States Patent
Jagannath

(10) Patent No.: US 11,917,418 B2
(45) Date of Patent: Feb. 27, 2024

(54) RENDERING DIGITIZED SERVICES IN A SMART ENVIRONMENT

(71) Applicant: CloserLook Search Services Inc., Columbus, OH (US)

(72) Inventor: Sumithra Jagannath, Blacklick, OH (US)

(73) Assignee: CloserLook Search Services Inc., Columbus, OH (US)

( * ) Notice: Subject to any disclaimer, the term of this patent is extended or adjusted under 35 U.S.C. 154(b) by 0 days.

(21) Appl. No.: 17/649,276

(22) Filed: Jan. 28, 2022

(65) Prior Publication Data

US 2022/0150710 A1    May 12, 2022

Related U.S. Application Data

(63) Continuation-in-part of application No. 16/223,936, filed on Dec. 18, 2018, now Pat. No. 11,263,716.

(51) Int. Cl.
  *H04W 12/64* (2021.01)
  *H04W 12/06* (2021.01)
  *H04W 12/47* (2021.01)
  *H04W 12/08* (2021.01)

(52) U.S. Cl.
  CPC ........... *H04W 12/64* (2021.01); *H04W 12/06* (2013.01); *H04W 12/08* (2013.01); *H04W 12/47* (2021.01)

(58) Field of Classification Search
  CPC ..... H04W 12/64; H04W 12/47; H04W 12/06; H04W 12/08
  USPC .......................................................... 705/5
  See application file for complete search history.

(56) References Cited

U.S. PATENT DOCUMENTS

| | | |
|---|---|---|
| 8,332,272 B2 | 12/2012 | Fisher |
| 8,523,069 B2 | 9/2013 | Hammad et al. |
| 8,731,835 B2 | 5/2014 | Chidlovskii et al. |
| 8,942,677 B2 | 1/2015 | Dixon et al. |
| 9,239,993 B2 | 1/2016 | Bergdale et al. |
| 9,514,589 B2 | 12/2016 | Raina et al. |

(Continued)

FOREIGN PATENT DOCUMENTS

| | | |
|---|---|---|
| KR | 20070080676 A | 8/2007 |
| WO | WO-2007118521 A1 | 10/2007 |
| WO | WO-2020131743 A1 | 6/2020 |

OTHER PUBLICATIONS

"Exploring ticketing approaches using mobile technologies: QR Codes, NFC and BLE" Published by IEEE Joao Leal, Rui Couto (Year: 2015).*

(Continued)

*Primary Examiner* — Zeina Elchanti
(74) *Attorney, Agent, or Firm* — Hamre, Schumann, Mueller & Larson, P.C.

(57) ABSTRACT

Techniques for managing access to a restricted setup are described. In an example, presence of a user device is detected within a predetermined range of the control device. Based on detecting the user device to be within the predetermined range, access permission data is received from the user device, where the access permission data comprises at least one of ticket and biometric data for entering a restricted setup. The access permission data is then compared with an access data, where the access data comprises at least one parameter indicative of validity of the access permission data. Access to the restricted setup is accordingly managed based on the comparison.

21 Claims, 6 Drawing Sheets

(56) References Cited

U.S. PATENT DOCUMENTS

| | | |
|---|---|---|
| 9,596,359 B2 | 3/2017 | Carlson et al. |
| 9,715,773 B2 | 7/2017 | Clemente et al. |
| 9,792,604 B2 | 10/2017 | Gray et al. |
| 9,813,850 B2 | 11/2017 | Lee et al. |
| 9,881,433 B2 | 1/2018 | Bergdale et al. |
| 2002/0040308 A1 | 4/2002 | Hasegawa et al. |
| 2003/0069763 A1 | 4/2003 | Gathman et al. |
| 2007/0276944 A1 | 11/2007 | Samovar et al. |
| 2011/0153495 A1 | 6/2011 | Dixon et al. |
| 2013/0090064 A1* | 4/2013 | Herron .................. H04W 8/005 455/41.2 |
| 2014/0304015 A1* | 10/2014 | McManus .............. G06Q 10/02 705/5 |
| 2015/0053757 A1 | 2/2015 | Williams et al. |
| 2015/0084741 A1 | 3/2015 | Bergdale et al. |
| 2015/0095197 A1 | 4/2015 | Eramian |
| 2015/0120558 A1 | 4/2015 | Andrews et al. |
| 2015/0178698 A1 | 6/2015 | Schulz et al. |
| 2015/0235477 A1 | 8/2015 | Simkin et al. |
| 2016/0231129 A1 | 8/2016 | Erez et al. |
| 2017/0116547 A1 | 4/2017 | Klinger et al. |
| 2017/0206201 A1 | 7/2017 | Chidlovskii |
| 2018/0068315 A1 | 3/2018 | Bergdale et al. |
| 2018/0107950 A1 | 4/2018 | Gonzalez et al. |
| 2018/0146374 A1* | 5/2018 | Golan .................. G06Q 20/127 |
| 2018/0278422 A1 | 9/2018 | Young et al. |
| 2018/0293523 A1 | 10/2018 | Bergdale et al. |
| 2019/0379128 A1* | 12/2019 | Tan ........................ H04W 4/029 |
| 2020/0193548 A1 | 6/2020 | Jagannath |

OTHER PUBLICATIONS

"U.S. Appl. No. 16/223,936, Non Final Office Action dated Mar. 17, 2021", 82 pgs.

"U.S. Appl. No. 16/223,936, Notice of Allowance date Oct. 25, 2021", 11 pgs.

"U.S. Appl. No. 16/223,936, Response filed Jun. 8, 2021 to Non Final Office Action dated Mar. 17, 2021", 21 pgs.

"International Application Serial No. PCT/US2019/066616, International Preliminary Report on Patentability dated Jul. 1, 2021", 8 pgs.

"International Application Serial No. PCT/US2019/066616, International Search Report dated Mar. 17, 2020", 2 pgs.

"International Application Serial No. PCT/US2019/066616, Written Opinion dated Mar. 17, 2020", 6 pgs.

Leal, Joao, et al., "Exploring ticketing approaches using mobile technologies: QR Codes, NFC and BLE", 2015 IEEE 18th International Conference on Intelligent Transportation Systems, (2015), 7-12.

Rehrl, Karl, et al., "Assisting Multimodal Travelers: Design and Prototypical Implementation of a Personal Travel Companion", IEEE Transactions On Intelligent Transportation Systems, vol. 8, No. 1, Mar. 2007, (Mar. 2007), 31-42.

* cited by examiner

RENDERING DIGITIZED SERVICES IN A SMART ENVIRONMENT

PRIORITY CLAIM TO RELATED APPLICATIONS

This application is a continuation-in-part of and claims the benefit of priority to U.S. application Ser. No. 16/223,936, entitled "Rendering Digitized Services in a Smart Environment," and filed 18 Dec. 2018, the benefit of priority of which is claimed herein, and which application is hereby incorporated herein by reference in its entirety.

BACKGROUND

With advancement in technology, digitization has become a norm these days. Various services are being digitized for ease and convenience of users. For instances, counter and telephone-based bookings for multiple services, such as transport services, hospitals, theatres, restaurants, hotels, and malls have been replaced by digital bookings that may be made using a user device. To avail the services, the user device may be used to book tickets for transport services, to make appointments to visit places, such as hospital, entertainment and sports centers, restaurant, and hotels, and to avail other similar services. The user device may provide multiple interfaces to avail multiple services offered at different places. For instance, an application may provide an interface to buy tickets for commuting between locations and another application may provide another interface to book a ticket to a sports game. Further, advanced cities, also known as smart cities, are being developed where all such service may be digitized and interconnected.

DETAILED DESCRIPTION

Figure 1:
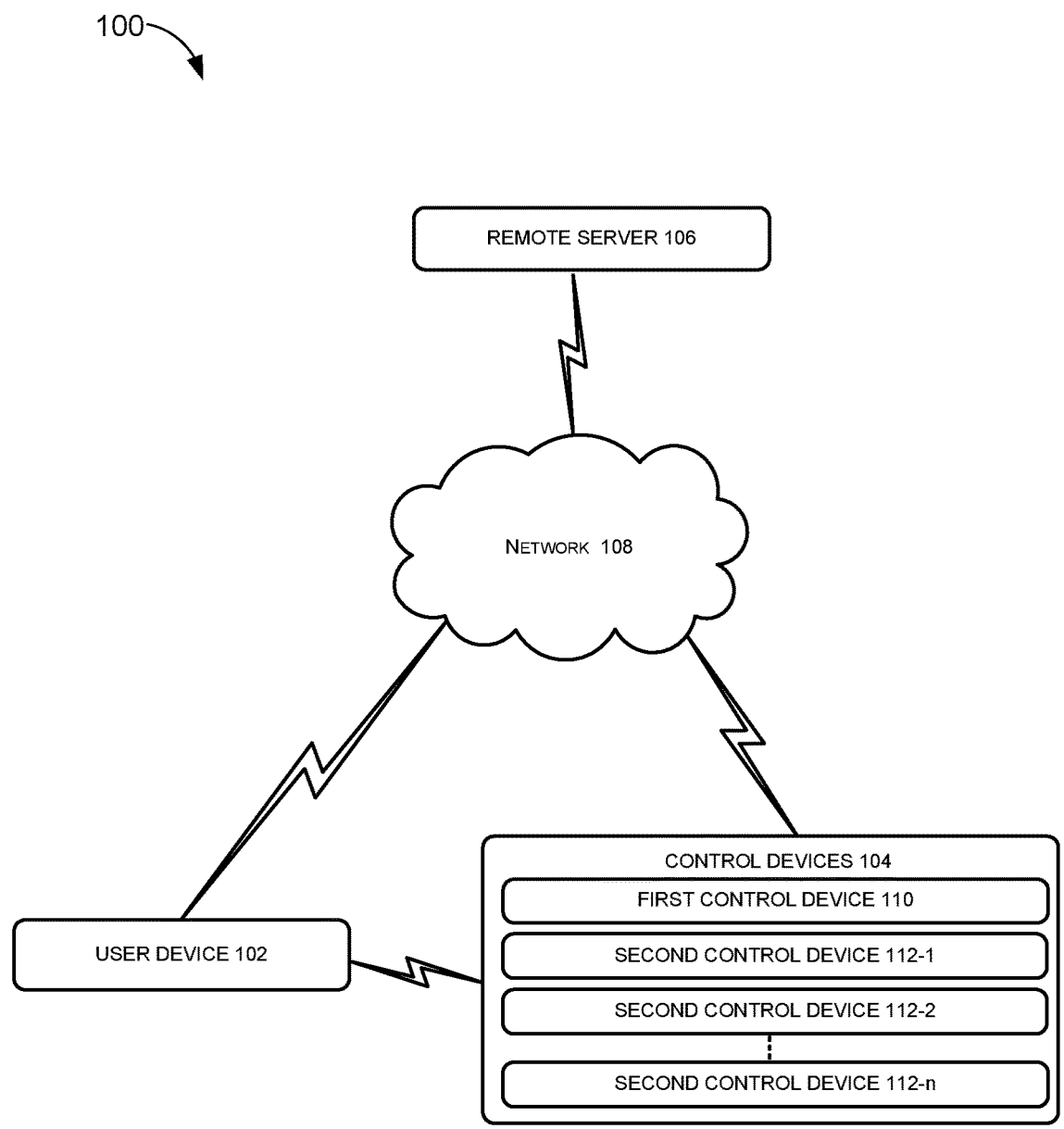
FIG. 1 illustrates a system for rendering digitized services in a smart environment, in accordance with an example implementation of present subject matter.

Digitization of services has revolutionized the way service industry works, making service providers to move away from traditional methods and platforms of rendering services to new digitized platform. A plurality of digital platforms and applications have been developed to provide multiple services to the users. For instance, an application may be used to plan a trip for a user planning to commute from one location to another location, while another application may be used to book appointments at various places of interest, such as hotels, sports venues, entertainment venues, and theatres. The user may thus open the different applications on his user device and perform the desired activities, such as booking tickets.

However, in case a user needs to use varying services, the user may require accessing multiple applications offering the varying services offered by multiple service providers. For instance, in a case the user may wish to watch a movie at a particular theatre located at a location distant from the user's home. In such situations, the user may first use a travel application, from among multiple travel application, to first book tickets for a particular means of transport to commute to the theatre. The user may then use a second application to purchase tickets to the theatre. Using different applications to avail multiple services makes the entire process tedious and degrades user experience. Further, the user may have to visit multiple applications offering alternate options for the same service, to select an optimum service provider. For instance, the user may have to visit applications of different cab service providers, bus service providers, local tram or rail network service providers before finalizing on a particular mode of transport and service provider for the commute.

Operating multiple applications may be tedious and time consuming for the users. Further, having multiple applications running on the user device may be resource consuming and may affect operational efficiency of the user device. Further, a user may need to provide details of desired commute, service, time, and date of availing the service into the multiple applications. The users may thus feel discomfort using the digital platform and opt not to use the applications and resort to other manual means to avail the services.

Further, once a service, such as an appointment at a hospital, travel using a particular transport system is booked, a ticket or an appointment slip may be generated. The ticket may be one of a physical ticket or an electronic ticket. When the user reaches the place of interest to avail the services, the appointment may be authenticated either manually or using a validation device. In an example, the user or an operator may have to scan a QR code on the electronic ticket or a QR code on a physical ticket on the validation device to authenticate the appointment. A scanner coupled to the validation device may read the characters off the ticket and send the ticket details to a server. The ticket details are verified at the server and the validation confirmation is then sent back to the user device. The process of scanning every user device or physical ticket on the validation device is a tedious and time-consuming task involving excessive manual efforts.

Further, such a validation process requires continuous network connectivity to facilitate exchange of data between the validation device and the server to validate tickets. In a situation, when network connectivity is lost or disrupted, the ticket validation process stops creating further inconvenience to users. Also, during peak times of usage, such as weekends, public holidays, office timings on weekdays, like 7 am to 9 am and 4 pm to 6 pm the rush at one or more setups of one or more service providers may increase due to increased footfall. In such a situation, validating each ticket separately may increase the rush at one or more setups creating a situation of chaos.

The present subject matter discloses example implementations of method and systems for rendering digitized services in a smart environment. In one example implementation of the present subject matter, techniques of rendering digitized services includes ascertaining a user preference for accessing a restricted setup, such as a transport vehicle, a commercial establishment, such as an office or a workplace, a place of entertainment or amusement and subsequently accessing permission for one or more such restricted setups are disclosed. The access permission may include one of a ticket, appointment, and an entry pass. In an example, the tickets for one or more restricted setups may be obtained at once and stored in a user device. Before visiting the one or more restricted setups, the user first activates the access permission. As the user comes in proximity of the restricted setup, one or more second control devices present in the vicinity are detected. The one or more second control devices may be wirelessly detected by one or more user devices using techniques of near field communication, such as Bluetooth. In one example, the one or more second control devices may be detected based on reception of plurality of data packets received from one or more control devices.

In an example of the present subject matter, the plurality of data packets received from one or more second control devices may be analysed to obtain access data from each of the second control devices. The access data received from one or more second control devices may further be compared with access permission data related to a ticket stored on the user device. Based on the comparison, a determination of a valid second control is made. A successful determination of the valid second control device indicates that the user has a valid access permission to enter the restricted setup. An authorization successful status indicating presence of a valid access permission may then sent to the valid second control device.

Thus, a single interface may be provided to assist a user in planning a days' itinerary and accessing one or more restricted setups. The single interface may allow the user to avail a variety of services on a single platform. This may avoid the requirement of multiple applications to avail different services thus saving system's resources and improving operational efficiency of the user device. The interface may further track the user's choices along with user's schedule to plan multiple actions, thus providing personalization of interface as per the user's daily itineraries. Further, the validation may take place on the user device and may be based on proximity of the user device and the second control device. This may avoid the requirement of the network connection for validation and may render the entire validation process efficient. Further, performing entire validation process on the user device may further reduce the load on second control devices and improve their operational efficiency. Furthermore, since the validation process involves the exchange of minimal exchange of data, i.e., the access permission data and the status indicating the successful validation of the ticket, the overall security of the user device is boosted. That is, even if the connection between the user device and the one or more control devices or the connection between the user device and the remote server is compromised, the user device credentials are not accessible.

In another example of the present subject matter, techniques for managing access to a restricted setup are described. In an example, presence of a user device may be detected within a predetermined range of a control device. Based on detecting the user device to be within the predetermined range, access permission data may be received from the user device, where the access permission data comprises at least one of ticket and biometric data for entering a restricted setup. The access permission data may then be compared with an access data, where the access data comprises at least one parameter indicative of validity of the access permission data. If the access permission data is found to be similar to the access data, a user of the user device is allowed to enter the restricted setup. Conversely, the user is denied access to the restricted setup.

In this manner, the access permission data may be received and validated without any user intervention, thereby reducing the tediousness and time consumption associated with manual validation of tickets and/or permission for entering the restricted setup.

The above techniques are further described with reference to FIGS. 1 to 5. It would be noted that the description and the Figures merely illustrate the principles of the present subject matter along with examples described herein and would not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates a system 100 for rendering digitized services, in accordance with an example of present subject matter. The system 100 may provide a number of digitized services to the user. For instance, the system 100 may provide the user with a digital platform to plan and execute a first action. In an example, the first action may comprise visiting a restricted setup and availing services provided therein. The first action may be specified either based on a user input or user schedule saved in the user device. Examples of restricted setups may include, but are not limited to transport services including public transit services, such as bus, train, and trams, and private transport means, such as cabs, bike share, ride share, and car rentals services; and places of interest like health facilities, such as hospitals and clinics; commercial establishments, such as malls, offices, retail stores, banks and financial institutions, supermarkets, research facilities/laboratories; and places of entertainment and recreation, such as amusement parks, sports venues, restaurants, theatres, bars, clubs.

Once the first action is defined, the system 100 may identify a plurality of second actions that are to be performed to execute the first action. In an example, when the first action includes commuting from one location to another location, the second action may include identification of one or more transport services for commuting between the first location and the second location, obtaining tickets for the identified one or more transport services, and other actions. In another example, when the first action includes visiting a place of interest, the second action may include obtaining one of the tickets, prior appointment, or entry pass for place of interest, validation of tickets at the place of interest, and other actions.

In one example implementation of the present subject matter, the system 100 may comprise a user device 102, one or more control devices 104, and a remote server 106. The user device 102 and the one or more control device 104 may be connected to the remote server via a network 108. The user device 102 may be operable to be connected to one or more control device 104 via a wireless communication link. The wireless communication link may employ multiple wireless technologies that may include but are not limited to Wi-fi, Bluetooth, Near Field Communication (NFC), and Radio frequency identification (RFID).

Examples of the user device 102 may include, but are not limited to, smartphones, tablets, smartwatches, personal digital assistants, and other devices that may support wireless communication technologies, such as access card, for instance NFC based smart cards. The one or more control device 104 may support wireless communication technologies. The one or more control device 104 may include a first control device 110 and one or more second control devices 112-1, 112-2, . . . , and 112-n. The second control devices 112-1, 112-2, . . . , and 112-n are hereinafter collectively referred to as second control devices 112 and individually referred to as second control device 112. The second control devices 112 may further be coupled to the first control device 110 by either a wired or wireless communication. In some example embodiments of the system 100, the functionality of the first control device 110 and the second control devices 112 may be included in a single physical device, as will be elaborated subsequently.

In an example implementation of present subject matter, the user device 102 may receive an input specifying the first action. In an example, the first action may include visiting a restricted setup. In response to the user input, an access permission to enter the restricted setup may be obtained. Once the access permission to enter the restricted setup is obtained by the user device 102, the user may first commute from his location to the location of the one or more restricted setups. On reaching the restricted setup, the user may activate the access permission saved on the user device 102. Once the access permission is activated, the presence of the second control devices 112, present in the proximity of the user device 102, may be detected. The second control devices 112 may be present in one or more restricted setups present in the proximity of the user device 102. A second control device, corresponding to the restricted setup to be visited, from the second control devices 112 may then be detected based on reception of one or more data packets from the second control devices 112.

In an example of the present subject matter, the one or more data packets received from the second control devices 112 may be analysed to obtain access data corresponding to the second control devices 112. The access data may include a second control device ID, and one of a route ID and a place ID depending on the type of restricted setup. For example, if the restricted setup is a transport service, the access data may include a route ID of the transport service. In another example, if the restricted setup is one of a hospital, mall, theatre, and hotel, the access data may include a place ID. In an example, the place ID may indicate the kind of services being provided in the restricted setups.

Further, the access data received from the second control devices 112 may be compared with an access permission data stored on the user device 102. The access permission data may include one of a ticket data, an entry pass data, and a prior appointment data. The access permission data may include one of a place ID and route ID, depending on the kind of services to be availed by the user. For example, if the user has booked a ticket to commute from one location to another location using transport service, the access permission data may include a route ID. In another example, if the user has booked a ticket to a sports venue, the access permission data may include a place ID corresponding to one or more sports venues providing the entertainment to be availed by the user. Further, comparing the access data with access permission data may include comparison of the route ID stored in access data with the route ID stored in access permission data or comparison of the place ID stored in access data with the place ID stored in access permission data.

Based on the comparison of the access data with the access permission data, a valid second device from among the second control devices 112 may be determined. The valid second control device may be present within the restricted setup for which the user device 102 has the access permissions. In response to determination of valid access permission, an authorization successful status indicating the presence of the valid access permission to enter the restricted setup may be transmitted to the second control device. In an example, the user device 102 may also send the access permission data along with the authorization successful status to the remote server 106.

Subsequently, the second control device may send the authorization successful status and the access permission data to the first control device 110 present within the restricted setup. The first control device 110 may receive the authorization successful status and the access permission data and check if a network connectivity to the remote server 106 is available. If network connectivity to the remote server 106 is available, the first control device 110 may transmit the authorization successful status and the access permission data to the remote server 106. Further, if the network connectivity is not found, the first control device 110 may retain the authorization successful status and the access permission data and wait for the network connectivity to be restored. Once the network connection is restored, the authorization successful status along with the access permission data may be transmitted to the remote server 106 by the first control device 110.

The remote server 106 may then receive the authorization successful status and the access permission data from the first control device 110 and user device 102. The authorization successful status along with access permission data received from the user device 102 and the first control device 110 may be then compared to ascertain consistency in the authorization status and access permission data received from the user device 102 and the first control device 110. If found consistent, the remote server 106 may make an entry into a database indicating the presence of the user at the restricted setup along with a time stamp. In case of inconsistency, the data received from the first control device 110 may be considered authentic as the user may have turned off internet on the mobile unintentionally or intentionally.

Figure 2A:
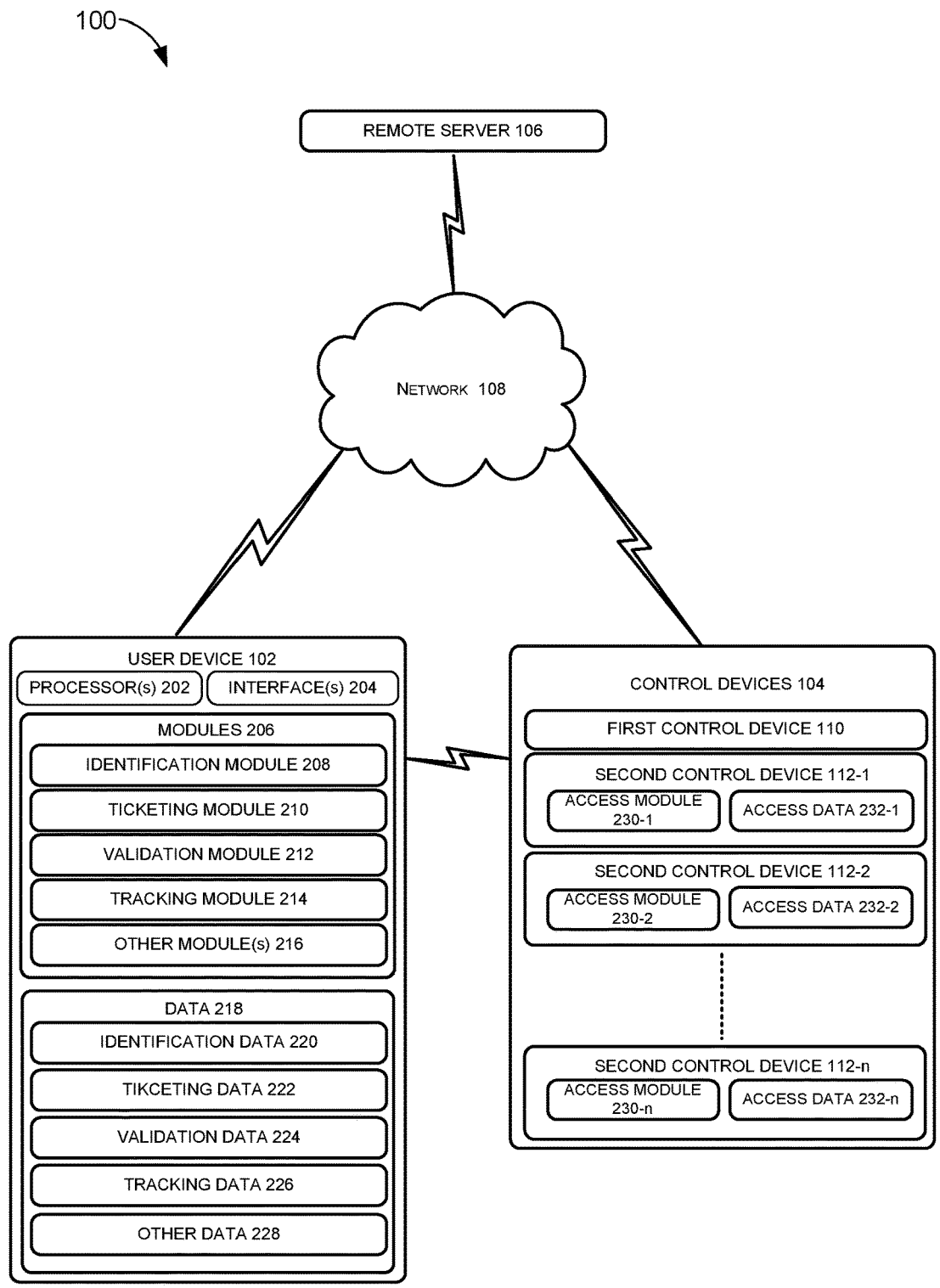
FIG. 2A illustrates a system for rendering digitized services in a smart environment, in accordance with another example implementation of present subject matter.

FIG. 2A illustrates a system 100 for rendering digitized services, in accordance with another example of present subject matter. As described earlier, the system 100 may include the user device 102, the control devices 104, and the remote server 106, connected to each other either directly or through the network 108.

The user device 102 may further include processor(s) 202 and interface(s) 204 coupled to the processor 202. The functions of the various elements shown in the Figures, including any functional blocks labeled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, conventional and/or custom, may also be included.

The user device 102 may further include one or more modules 206. The modules 206 may include an identification module 208, a ticketing module 210, a validation module 212, a tracking module 214, other modules 216. In an example, the identification module 208, the ticketing module 210, the validation module 212, and other modules 216 may be implemented as separate hardware capable of performing different functionalities of the user device 102. The identification module 208, the ticketing module 210, the validation module 212, the tracking module 214, and other modules 216 may include routines, programs, objects, components, data structures, and the like, which perform particular tasks or implement particular abstract data types. The modules 206 may further include electronic circuitry or a combination of electronic circuitry and control programs that operate the components according to the functions described herein. In an example, the other modules 216 may perform functionalities that supplement other functions of the user device 102.

The user device 102 may further include data 218. The data 218 serves, among other things, as a repository for storing data that may be fetched, processed, received, or generated by the identification module 208, the ticketing module 210, the validation module 212, the tracking module 214, and other modules 216. In an example, the data 218 may include identification data 220, ticketing data 222, validation data 224, tracking data 226, and other data 228. In an example of the present subject matter, the identification data 220 may include an input provided by the user related to the identification of the first action to be performed. In an example, the first action may comprise the user input for commuting from one location to another location. The ticketing data 222 may include all the tickets purchased by the users for availing services in one or more restricted setups. Further, the validation data 224 may include ticket detection data corresponding to one or more tickets purchased by the user. The tracking data 226 may comprise the data related to presence of second control devices 112 in the proximity of the user device 102. The data 218 may further include other data 228 to store data generated by other modules 216 of the user device 102.

Further, each of the second control device 112 may comprise an access module 230 and access data 232. In an example, a second control device 212-1 may comprise an access module 230-1 and an access data 232-1, a second control device 212-2 may comprise an access module 230-2 and an access data 232-2, . . . , a second control device 212-n may comprise an access module 230-n and an access data 232-n. The access module 230 may be implemented as separate hardware capable of performing different functionalities of the second control device 112. The access module 230 may include routines, programs, objects, components, data structures, and the like, which perform particular tasks or implement particular abstract data types. The access module 230 may further include electronic circuitry or a combination of electronic circuitry and control programs that operate the components according to the functions described herein. In an example, the access module 230 may further perform functionalities that supplement other functions of the second control device 112. The access data 232 may include data generated and used by the access module 230.

The access module 230 may allow the second control device 112 to transmit and receive data. The data may be transmitted and received either through a wired or a wireless connection. Further, the access data may comprise one of an access permission data and a ticket detection data. The access permission data may include place ID and ticket detection data may include route ID.

In an example implementation of present subject matter, a user may use the user device 102 to plan and schedule the itinerary for the day. In one example, a user may save his schedule in the user device 102 to personalise the activities to be carried out at a predetermined time on each day. In one another example, the user may provide inputs every day to schedule the itinerary. To plan the itinerary, the user may provide inputs to the user device 102 through different interfaces 204, such as a graphical user interface. In an example, the user may have a schedule to commute from home to work every day at a predetermined time, say, 8:00 am. The user device 102 accordingly may suggest the user to leave for work as per the schedule. In one example, the user may use a transport service which may include a public transit service, including but not limited to, buses, trains, taxi, and trams; a private cab; or a personal vehicle to commute from home to work.

In case the user uses the personal vehicle to commute, the user device 102 may suggest available routes based on one or more conditions, such as traffic, weather, and best route. However, in a situation where the personal vehicle of the user is not available, for instance, because of pending service schedule, the user device 102 may assist the user in availing the services of a public transit service or a private cab. For example, the user may make an entry in his schedule to indicate that his vehicle is out for service. The identification module 208 of the user device 102 may analyse the change in user schedule and next day at 8:00 suggest the user to leave for work using one or more other transport services that the user may take to commute from home to work.

To assist the user in availing transport services apart from the user's private vehicle, the ticketing module 210 of the user device 102 may initially determine one or more first transport service for commuting between the home and work based on one or more travel conditions that may include user preferences, saved trips, saved routes, traffic, weather, best route, cost availability, and occupancy of the one or more transport services. Accordingly, a list of one or more transport services may be rendered to the user along with real-time location, occupancy, and an estimated time of arrival of one or more transport services. The user may then select a first transport service from one or more determined transport services.

Further, the ticketing module 210 may obtain a ticket for the first transport service selected by the user. The ticket may include a ticket identifier where the ticket identifier may include a ticket number and a route ID for commuting between the home and work using the first transport service. Once the ticketing module 210 has obtained the ticket, the validation module 212 may be informed about the scheduled time for a vehicle of the first transport service. Once the ticket is obtained, the user may reach the proximity of the restricted setup and may activate the ticket. Subsequently, the validation module 212 of the user device 102 may initiate detection of the second control devices 112 in the proximity of the user device 102, at a predetermined time before the scheduled time of the first transport service. In an example, the predefined time may be a period of, say 2 minutes before the scheduled time of the vehicle of the first transport service.

Once the validation module 212 initiates the detection, the validation module 212 may receive ticket detection data from the second control devices 112 coming in proximity with the user device 102, for instance, when the user reaches a bus stop. In an example, the validation module may receive ticket detection data transmitted by the access module 230 of the second control devices 112. The second control devices 112 may transmit the ticket detection data using a wireless technology, including but not limited to, Bluetooth, wi-fi, NFC, RFID and others. In an example, the ticket detection data may include a route ID and a second control device ID. The route ID may indicate the route of the transport service on which a vehicle having the second control device 112 is plying. The second control device ID may be indicative of an identification number of the second control device 112 transmitting the ticket detection data.

In one example, the second control devices 112 may transmit the ticket detection data when they are approaching a designated stop of the vehicle having the second control device 112. In another example, the second control devices 112 may periodically transmit the ticket detection data, at a predetermined frequency, say, every 20 seconds.

The validation module 212 may receive ticket detection data from the one or more second control devices 112 and compare the ticket detection data with the ticket. The user device 102 may compare the route ID received in the ticket detection data with a route ID corresponding to the ticket. If the route ID received in the ticket detection data is found to be consistent with the route ID corresponding to the ticket for a second control device 112, say the second control device 112-1, the validation module 212 may send a status indicating a valid ticket to the second control device 112-1, along with the ticket identifier. In an example, the valid ticket may indicate a ticket that has been successfully validated. On successful validation of the ticket by the user device 102, the user may board the vehicle having the second control device 112-1 detected by the validation module 112, to commute from home to work. The validation module 212 may further transmit the ticket identifier and a status indicating the boarding of vehicle to the remote server 106.

The second control device 112-1 may further send the status indicating the valid ticket and the ticket identifier to the first control device 110. The first control device 110 may then check the presence of a network connection to access the remote server 106. If the presence of the network connection between the first control device 110 and the remote server 106 is confirmed, the first control device may transmit the status indicating the valid ticket and the ticket identifier to the remote server 106. In an example, the first control device 110 may check for the presence of the network connection at regular intervals, and may transmit to the remote server 106, the status indicating a valid ticket and the ticket identifier corresponding to one or more user devices accordingly.

Once the user has boarded the vehicle providing the first transport service, the tracking module 214 of the user device 102 may further ascertain the presence of the second control device 112 at regular intervals. The presence of the second control device 112 may be ascertained based on the detection of messages from the second control device at regular intervals, where the message from the second control device may include a route ID. The route ID included in the message from the second control device may then be compared with the route ID stored in the valid ticket. If the route ID included in the message from the second control device is found to be consistent with the route ID stored in the valid ticket, the tracking module 214 may transmit a data packet to the remote server 106, where the data packet may include the geographical location of the user device 102 along with a timestamp.

The remote server 106 may receive one or more data packets from one or more user devices. The data packets may indicate the presence of the user devices in the vehicle and geographical location of the user devices along with timestamp. The data packets received from one or more user devices may then be analysed at the remote server 106 to determine various parameters, such as the occupancy of the vehicle and the traffic. The remote server 106 may then determine the occupancy ratio of the vehicle. In an example, the occupancy ratio of the vehicle may be determined by comparison of occupancy of the vehicle with threshold capacity of the vehicle. In an example, the threshold capacity may be a maximum seating capacity of the vehicle. The remote server 106 may further determine the estimated time of arrival of the vehicle at the location of a user device 102 out of one or more user devices. Based on the occupancy ratio and the estimated time of arrival, the remote server 106 may then suggest an alternate transport service to a user device from one or more user devices.

In an example implementation of present subject matter, the user after reaching work may further wish to visit a place of interest to avail one or more services. In an example, the place of interest may include one or more restricted setups, including but not limited to, health facilities, such as hospitals and clinics; commercial establishments, such as malls, offices, retail stores, banks and financial institutions, supermarkets; places of entertainment and recreation, such as amusement parks, restaurants, theatres, bars, clubs; and other places. In an example, the user may wish to visit a theatre to watch a movie, for instance, after working hours are over. The user may thus travel from the work to the theatre in a public transit service to watch the movie. In an example, the identification module 208 may thus identify second actions to be performed, based on user's input for the first action involving watching a movie, for example, a search request for movie timings, or a request for booking tickets. The first actions may be identified as commuting from work to theatre and then visiting the theatre. Accordingly, the ticketing module 210 may obtain tickets to commute from work to theatre and to watch the movie at the theatre, as previously described.

Further, the user may commute from the work to the theatre using a transport service in one or more transport services as described above. Once the user reaches the theatre, the user device 102 may initiate detection of the second control device 112 located within the theatre, for instance, by switching ON a communication interface for receiving broadcast data packets, transmitted by the second control devices 112. As previously described, the validation module 212 may receive ticket detection data from second control devices 112 installed in a complex housing of the theatre. The ticket detection data may include a place ID and a second device ID. The place ID received in the ticket detection data may be compared with the place ID stored in the ticket. If the place ID received in the ticket detection data is found to be same as place ID stored in the ticket, the validation module 212 may send a status indicating the detection of a valid ticket to the second control device 112, requesting the second control device 112 for an access to the theatre. The validation module 212 may further transmit a status indicating the presence of the user at the theatre to the remote server 106.

The second control device 112-1 may further send the status indicating the valid ticket and the ticket identifier to the first control device 110. The first control device may then check the presence of a network connection to access the remote server 106. If the presence of the network connection between the first control device 110 and remote server 106 is confirmed, the first control device may transmit the status indicating the valid ticket and the ticket identifier to the remote server 106. In an example, the first control device may check for the presence of the network connection at regular intervals, and may transmit the status indicating a valid ticket and the ticket identifier corresponding to one or more user devices accordingly.

Once the user enters the theatre, the tracking module 214 of the user device 102 may further ascertain the presence of the second control device 112 at regular intervals. The presence of the second control device may be ascertained based on the detection of messages from the second control device at regular intervals, where the message from the second control device may include a place ID. The place ID included in the message from the second control device may then be compared with the place ID stored in the valid ticket. If the place ID included in the message from the second control device is found to be consistent with the place ID stored in the valid ticket, the tracking module 214 may transmit a data packet to the remote server 106, where the data packet may indicate the presence of the user at the theatre along with a timestamp.

In one example, the remote server 106 may receive one or more data packets from one or more user devices within a restricted setup, say, the theatre. The data packets may indicate the presence of the user devices at the restricted setup along with timestamp. The data packets received from one or more user devices may then be analysed at the remote server 106 to determine the occupancy of the restricted setup. The remote server 106 may then determine the occupancy ratio of the restricted setup. In an example, the occupancy ratio of the restricted setup may be determined by comparison of occupancy of the restricted setup with threshold capacity of the restricted setup. If the occupancy of the restricted setup is determined to be equal to or above a predetermined threshold occupancy, the remote server 106 may suggest an alternate restricted setup to other user devices trying to obtain access permit for the restricted setup. In an example, the threshold occupancy of the theatre may be a maximum seating capacity of the theatre.

For instance, in the above example, the remote server 106 may receive one or more data packets from one or more user devices within the theatre. The data packets may indicate the presence of the user devices at the theatre along with timestamp. The data packets received from one or more user devices may then be analysed at the remote server 106 to determine the occupancy of the theatre and the occupancy ratio of the theatre. If the occupancy of the theatre is determined to be equal to or above a predetermined threshold, say, maximum seating capacity, the remote server 106 may suggest an alternate theatre to other user devices trying to obtain access permit for the theatre.

Figure 2B:
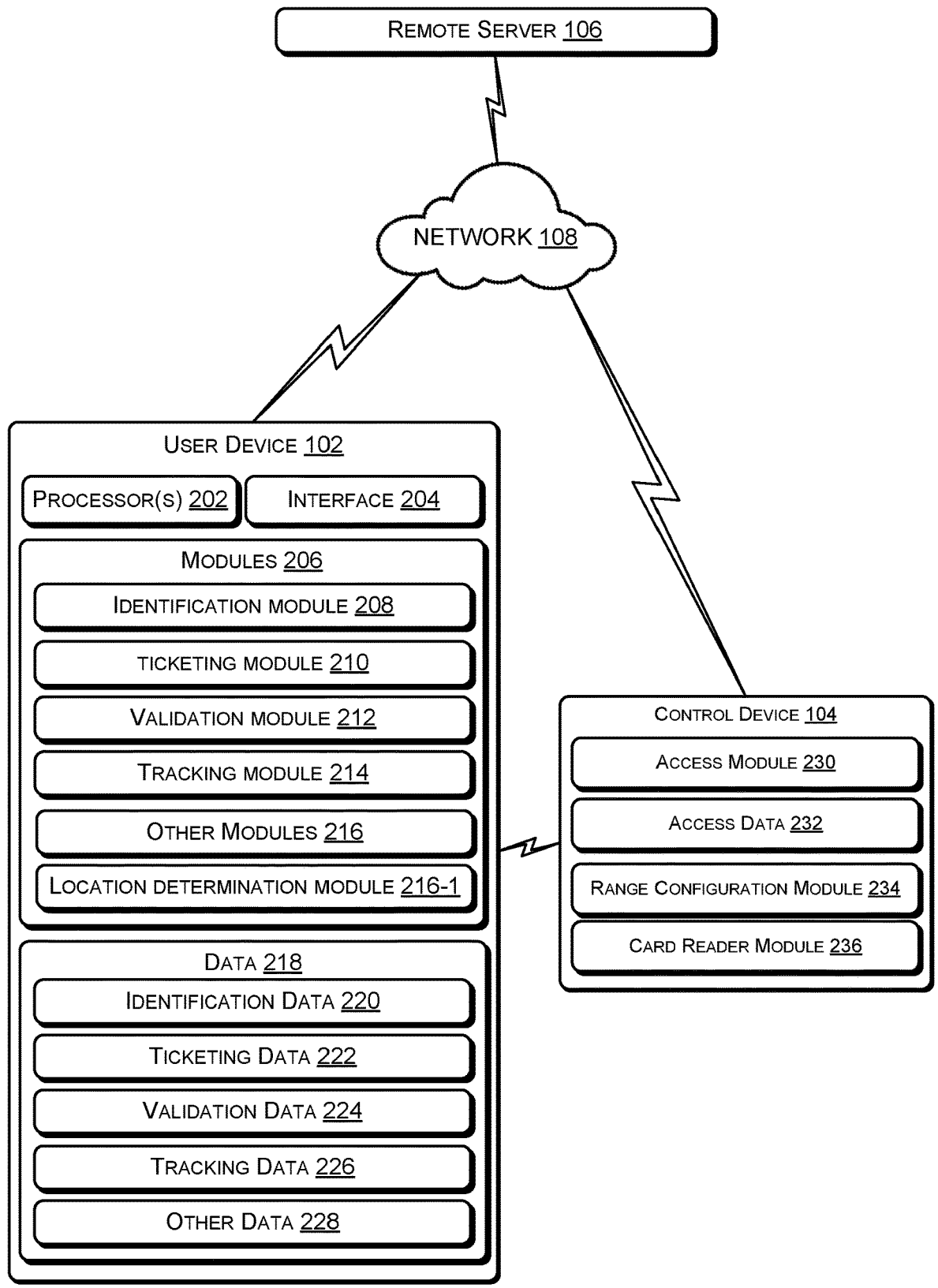
FIG. 2B illustrates a system for rendering digitized services in a smart environment, in accordance with another example implementation of present subject matter.

In an example implementation of the present subject matter, instead of or in addition to validating the access permission data on the user device 102, the access permission data may be validated by the control devices 104. In an example, the functionalities of the first control device 110 and the second control devices 112 may be combined into a single control device. Reference is now made to FIG. 2B that illustrates an example embodiment of the system 100 wherein the functionality of the first control device 110 and the second control devices 112 is included in a single physical device, referred to as the control device 104. As depicted in FIG. 2B, the control device 104 may include the access module 230 and the access data 232. In an example, the access module 230 may detect presence of the user device 102 within a predetermined range of the control device 104. The access module 230 may detect the presence of the user device 102 based on different communication technologies, such as Wi-fi, Bluetooth, Near Field Communication (NFC), and Radio frequency identification (RFID).

In one embodiment, based on detecting the user device 102 to be within the predetermined range of the control device 104, the control device 104 may request the access permission data from the user device 102. In another embodiment, based on the user device 102 being within the predetermined range of the control device 104, the user device 102 may begin transmitting the access permission data to the control device 104. The access permission data may represent a valid permission for entering the restricted setup, where the access permission data may include, but is not limited to, tickets and biometric data, such as fingerprint signature, retina signature, and facial recognition signature.

In an example, the predetermined range of the control device 104 may be configured to allow flexibility in utilizing the control device 104 at different restricted setups. In the example, the control device 104 includes a range configuration module 234 to configure a predetermined range of the control device 104. The range configuration module 234 may be implemented to alter the hardware capability of the control device 104 so as to enable if for performing different functionalities. In an example, the range configuration module 234 may alter the hardware capability of a Bluetooth range of the control device 104. For instance, the range configuration module 234 may enable different ranges to be configured for the Bluetooth antenna of the control device 104. In another example, the range configuration module 234 may allow the NFC antenna of the control device 104 to be configured.

The range configuration module 234 may include routines, programs, objects, components, data structures, and the like, which perform particular tasks or implement particular abstract data types. The range configuration module 234 may further include electronic circuitry or a combination of electronic circuitry and control programs that operate the components according to the functions described herein.

In the example, the range configuration module 234 may configure the predetermined range of the control device 104 based on multiple factors, such as size of the restricted setup, size of an entry point of the restricted setup, and size of an exit point of the restricted setup. For instance, when the restricted setup is a vehicle, the range configuration module 234 may configure the predetermined range of the control device 104 to be about 3 feet. On the other hand, when the restricted setup is a restricted premises, such as an office, hospital, mall, and theatre, the range configuration module 234 may configure the predetermined range of the control device 104 based on a size of an entry point of the restricted setup. In an example, for a restricted premises, the predetermined range may be about 20 feet.

Further, embodiments wherein the predetermined range of the control device 104 is configured independently for the entry point of the restricted setup and size of an exit point of the restricted setup are also possible. In an example, the range configuration module 234 may configure the predetermined range of the control device 104 to be more than 1 inch and less than 5 feet for the entry point of the restricted setup and more than 5 feet and less than 100 feet for the exit point of the restricted setup.

The range configuration module 234 may configure the predetermined range within which the user device 102 is to be detected by the control device 104. In an example, the range configuration module 234 may configure the predetermined range of the control device 104 by altering an operating power being supplied to a Bluetooth module of the control device 104. In an example, to facilitate configuration of the Bluetooth module, the control device 104 may include a range map including different Received Signal Strength Indicators (RSSI) mapped to different operating powers. To configure the predetermined range of the Bluetooth module for the control device 104, the range configuration module 234 may select one of the RSSI and corresponding operating power. Similarly, to configure the predetermined range of another Bluetooth module residing in the control device 104, the range configuration module 234 may select another one of the mappings of the RSSI and the operating power. In this manner, the range configuration module 232 may allow different Bluetooth modules residing in the control device 104 to be configured for detecting the user device 102 at different ranges. It would be noted that having different Bluetooth modules configured to detect the user devices at different predetermined ranges may allow access permission data being received multiple user devices to be validated simultaneously. This, in turn, may allow access for multiple user devices to be managed simultaneously, thereby improving the overall speed and reducing the time required to enter the restricted setup.

In another example, the access module 230 may configure the predetermined range of the control device 104 by utilizing different frequency bands for communicating with the user device 102 via Wi-fi to detect the presence of user devices 102.

On reception of the access permission data from the user device 102, the access module 230 may compare the access permission data with the access data stored on the control device 104 to validate the access permission data. In an example, the access data may include at least one parameter that may allow validation of the access permission data. For instance, when the access permission data is a ticket, the at least one parameter may be a ticket identifier. Similarly, when the access permission data is the biometric data, the at least one parameter may be a hash value of the biometric data.

In an example, the at least one parameter is received when a user obtains access permission data for entering the restricted setup. For instance, when a user obtains a ticket for the restricted setup from a ticketing portal, a copy of ticket may be sent to the user device 102 and a corresponding ticket identifier may be received on the control device 104. Similarly, when a user registers their biometric data for entering the restricted setup, a copy of hash value of the biometric data may also be received on the control device 110.

If the access module 230 determines that the access data includes a ticket identifier and/or hash value corresponding to the access permission data received from the user device 102, the access module 230 may allow access to the restricted setup. Conversely, the access module 230 may deny access to the restricted setup and may generate a notification indicating absence of a valid permission for the user device 102.

In an example, the control device 104 may further include a card reader module 236 that may allow to manage access to the restricted setup based on Near Field Communication (NFC) based access cards. In operation, when a ticket to a restricted setup is purchased from a ticketing portal, the access permission data for the ticket may be stored on a user account associated with an access card. The user account may reside either in the user device 102 or the remote server 106 coupled to the user device 102. Subsequently, the card reader module 236 may detect the presence of the access card within the predetermined range of the control device 104. In an example, to detect the presence of the access card within the predetermined range of the control device 104, the card reader module 232 may transmit NFC signals at regular intervals. The NFC based access cards, on reception of the NFC signal, may transmit access permission data to the control device 104. Thereafter, the access module 230 may compare the access permission data with the access data to validate the access permission data and manage access to the restricted setup.

In another example implementation of the present subject matter, instead of the control device 104 detecting the user device 102 to be within the predetermined range of the control device 104, the user device 102 may detect a control device, such as the control device 104, for validation of the access permission data. In the example, the user device 102 may include a location determination module 116-1 for determining a location of the user device 102. The location determination module 116-1 may determine the location of the user device 102 in a number of ways. In an example, the location determination module 116-1 may determine the location of the user device 102 based on signals received from a global positioning system (GPS) module (not shown) of the user device 102. In another example, the location determination module 116-1 may determine the location of the user device 102 by techniques based on triangulation, such as cell tower triangulation or Wi-Fi triangulation. The location of the user device 102 may then be stored in the tracking data 226.

In an example, the user device 102 may have geographical locations of one or more restricted setups stored thereon. For instance, a user device 102 may store the geographical location of the user's office and/or a movie theatre that the user frequents. Such geographical locations may be retrieved when tickets and/or permissions for entering one or more restricted setups are obtained. In the example, such geographical locations may be stored in the tracking data 226.

Once the location of the user device 102 is determined, the tracking module 214 may identify if the user device 102 is within a predetermined range of any of the geographical locations. If the tracking module 214 determines the user device 102 to be within the predetermined range of any of the geographical locations, the tracking module 214 may initiate detection of presence of a control device, such as the control device 102, at the geographical location. In an example, the tracking module 214 may detect the presence of the control device 104 within the predetermined range of the geographical location, when the user device 112 comes within the predetermined range of the control device 104. As understood, detecting the presence of the control device 104 based on location reduces the time period for which the user device 102 detects the control device for validation of the access permission data, thereby reducing the overall power consumption of the user device 102.

Based on the detection of the control device 104 within the predetermined range of the geographical location, the tracking module 214 may transmit the access permission data to the control device. In an example, the access permission data may be indicative of a permission for entering the restricted setup. Examples of the access permission data may include, but is not limited to, tickets and biometric data. In an example, the access permission data may be transmitted to the control device 104 without any user intervention. For instance, when the access permission data is a ticket, the tracking module 214, on detecting the presence of the control device 104, may automatically transmit a ticket identified associated with the ticket.

In another example, the transmission of the access permission data may entail active user intervention. For instance, when the access permission data is biometric data, the tracking module 214, on detecting the presence of the control device 104, may generate a notification to provide biometric data. In the example, the biometric data may be received using one or more biometric sensors (not shown), such as fingerprint scanner and retina scanner, included in the user device 102. On reception of the biometric data, the tracking module 214 may compute a hash value of the biometric data and transmit the same to the control device 104.

The access permission data may be transmitted to the control device 104 in a number of ways. In an example, on detection of the control device 104, the tracking module 214 may establish a connection with the control device 104 to transmit the access permission data. In another example, on detection of the control device 104, the tracking module 214 may transmit the access permission data using an IoT based communication protocol including, but not limited to, Message Queuing telemetry transport (MQTT) protocol, Advanced Message Queuing Protocol (AMQP), and Data Distribution Service (DDS) protocol, Extensible Messaging and presence protocol (XMPP). The above-mentioned communication protocols may allow exchange of telemetry messages even in resource-constrained networks. Accordingly, transmission of the access permission data using MQTT protocol may ensure delivery of the access permission data to the control device 104 even when a network connection on the user device 102 is not stable.

In an example, on receiving the access permission data, the control device 104 may compare the same with access data stored thereon and manage access to the restricted setup based on the comparison.

In an example implementation of the present subject matter, the access module 230 may also receive user identification information of a user along with the access permission data. The user identification information may include, but is not limited to, name, age, gender, and other identification credentials of the user. Such user identification information may be stored on a user account associated with the user device 102, where the user account may either reside on the user device 102 or the remote server 106 connected to the user device 102. In the example, along with validation of the access permission data, the access module 230 may also validate the user identification information of the user to identify whether the user also fulfills the other eligibility criteria for accessing the restricted setup. For instance, when an event is adult only, the control device 104 may not allow any user who might be having a valid ticket but is not a major.

In an example, the access module 230 may keep a count of user devices present within the restricted setup. In the example, the access module 230 may keep the count of the user devices present within the restricted setup by counting a number of user devices for which validation of access permission data is performed while entering the restricted setup. The access module 230 may further update the count every time a user device present within the restricted setup leaves the restricted setup. The exiting of the user device may be determined based on the validation of the access permission data at the exit point of the restricted setup or by determining that the user device has moved outside the predetermined range of the control device, for example. In this manner, the access module 230 may manage a virtual queue to the restricted setup which is updated every time user devices enter and exit the restricted setup.

In an example, the virtual queue may be setup to indicate if the user devices can be allowed to enter the restricted setup and schedule time and sequence of entry for multiple users. For instance, based on the number of user devices present within the restricted setup, any more users than a predefined threshold number that may be trying to enter the restricted setup may be allotted different time slots to ensure that there is no crowding in any specific area of the restricted setup. For instance, if the control device 102 is implemented in a stadium hosting a sports event, the access module 102 may schedule entry of users with a certain time difference between each user, such that, if there are narrow spaces between the entry of the stadium and the seating area, crowding at such narrow spaces may be avoided. In an example, the virtual queue may also indicate different entry points, such as different gates assigned to different user for entering the restricted setup.

Further, in another example, if the virtual queue indicates that the restricted setup has already reached its threshold capacity, the access module 230 may not allow any more user devices to enter the restricted setup until the number of user devices present within the restricted setup falls less than the threshold capacity. In such a situation, the access module 230 may create a waiting list and add to the waiting list, any other user devices that may attempt to enter the restricted setup. Further, each of the user devices included in the waiting list may be allotted a schedule for entering the restricted setup. In this manner, order in which people are to enter the restricted setup may be managed.

In an example, by counting the number of user devices entering and exiting the restricted setup, the access module 230 also facilitates determination of a state of occupancy of the restricted setup. The access module 230 may further transmit the state of occupancy of the restricted setup to the remote server 106. The remote server 106 may further transmit the state of occupancy of the restricted setup to user devices connected thereto.

In an example implementation, the tracking module 214 may, in response transmitting the access permission data to the at least one control device or otherwise, receive state of occupancy information relating to the restricted setup from one of the control devices in the restricted setup or the remote server. In an example, the state of occupancy information may aid the user in deciding various measures relating to his access to the restricted setup. For instance, in case the state of occupancy information indicates the restricted setup to be crowded, the user may decide to reschedule his visit. In another example, if the restricted setup is crowded, the user may decide to put-on a mask to protect himself from infections that are likely to be contacted at crowded places.

In another illustrative example, a control device may be installed within a vehicle. In the example, the control device may determine a number of user devices entering the vehicle and exiting the vehicle. Accordingly, the control device may maintain a state of occupancy of the vehicle. In an example, the control device installed within the vehicle may parallelly transmit state of occupancy of the vehicle to the remote server. In the example, the remote server may subsequently send the state of occupancy of the vehicle to the user devices already present within the vehicle or the user devices which are scheduled to enter the vehicle. Maintaining the state of occupancy of the vehicle and notifying the same may be useful in scenarios where the high occupancy may be detrimental to the riders.

Also, for instance, the state of occupancy information of a vehicle may aid to manage access of restricted setup, such as high-occupancy vehicle lanes by the vehicle. For example, when the vehicle is to enter a high-occupancy vehicle lane, a control device installed at an entry point of the lane may obtain the state of occupancy of the vehicle. Accordingly, the vehicle may either be allowed or denied access to the lane. The control device installed at an entry point may receive the state of occupancy from the remote server, a control device within the vehicle or may determine the same based on the access permission data received from user devices in the vehicle.

In another illustrative example, a user of the user device may plan to visit an amusement park. The user may accordingly obtain tickets for the amusement park from a ticketing portal. When the user reaches within a predetermined range at the geographical location of the amusement park, the user device may begin searching for a control device within the predetermined range to validate the ticket obtained from the ticketing portal. On detecting the control device within the predetermined range, the user device may transmit the ticket to the control device. Subsequently, the control device may compare the ticket with access data stored thereon, to identify whether a ticket identifier corresponding to the ticket is present in the access data. If the ticket identifier corresponding to the ticket is found in the access data, the user is allowed access to the amusement park.

Once the user has entered the amusement park, in an example, the user may also access one or more rides within the amusement park based on interaction of the user device with the control devices corresponding to the one or more rides. The user device may interact with the control devices corresponding to the one or more rides in a manner similar as explained above. For example, based on the interaction, access to a particular ride may be allowed or denied depending on whether the user purchased tickets/paid fare for the ride or not. As will be understood in light of the foregoing explanation, in the context of the present example, the ride is the restricted setup and the interaction between the control device and the user device is for exchange and verification of the access permission data, which, in the present example, is the tickets/details of the paid fare for the ride.

As explained above, in some examples, the control device may interact with the user device to manage access to the ride based on user identification information of the user corresponding to the user device as well. In the present example, based on user identification information received from a user device, the control device may determine whether the user meets a predefined age requirement for the ride and manage access to the ride accordingly.

In an example, the user may order food and beverages from a food stall at the amusement park. For instance, the user may purchase a food item from the user device and may receive an order number for his order. When the user reaches within a predetermined range, say 5 feet, near the food stall to collect his order, a control device installed at the food stall may detect the presence of the user device within the predetermined range. The control device may accordingly receive an order number from the user device, compare the order number against the order details available at the control device, and raise an alarm for delivering the food item corresponding to the user's order. Again, as will be understood, in the context of the present example, the food stall is the restricted setup and the interaction between the control device and the user device to manage access to the food stall comprises managing of the user's order. Managing the user's order may include not only scheduling the order or notifying user of order status but may also include, for example, managing the order based on the user identification information. For instance, if the user is identified to be a minor based on the user identification information, alcoholic beverages may be excluded from his order.

It will be appreciated that in the present example where the food stall is the restricted setup, interaction between the control device and the user device is for exchange and verification of the order details. In this context, the order details may serve as the access permission data. Thus, examples implementations where access to a restricted setup are managed based on order details are also possible. Accordingly, access permission data may comprise order details in some examples.

In this manner, the techniques described above may allow the user to avail multiple services with minimum user intervention, thereby providing seamless experience to the user within the amusement park.

Figure 3:
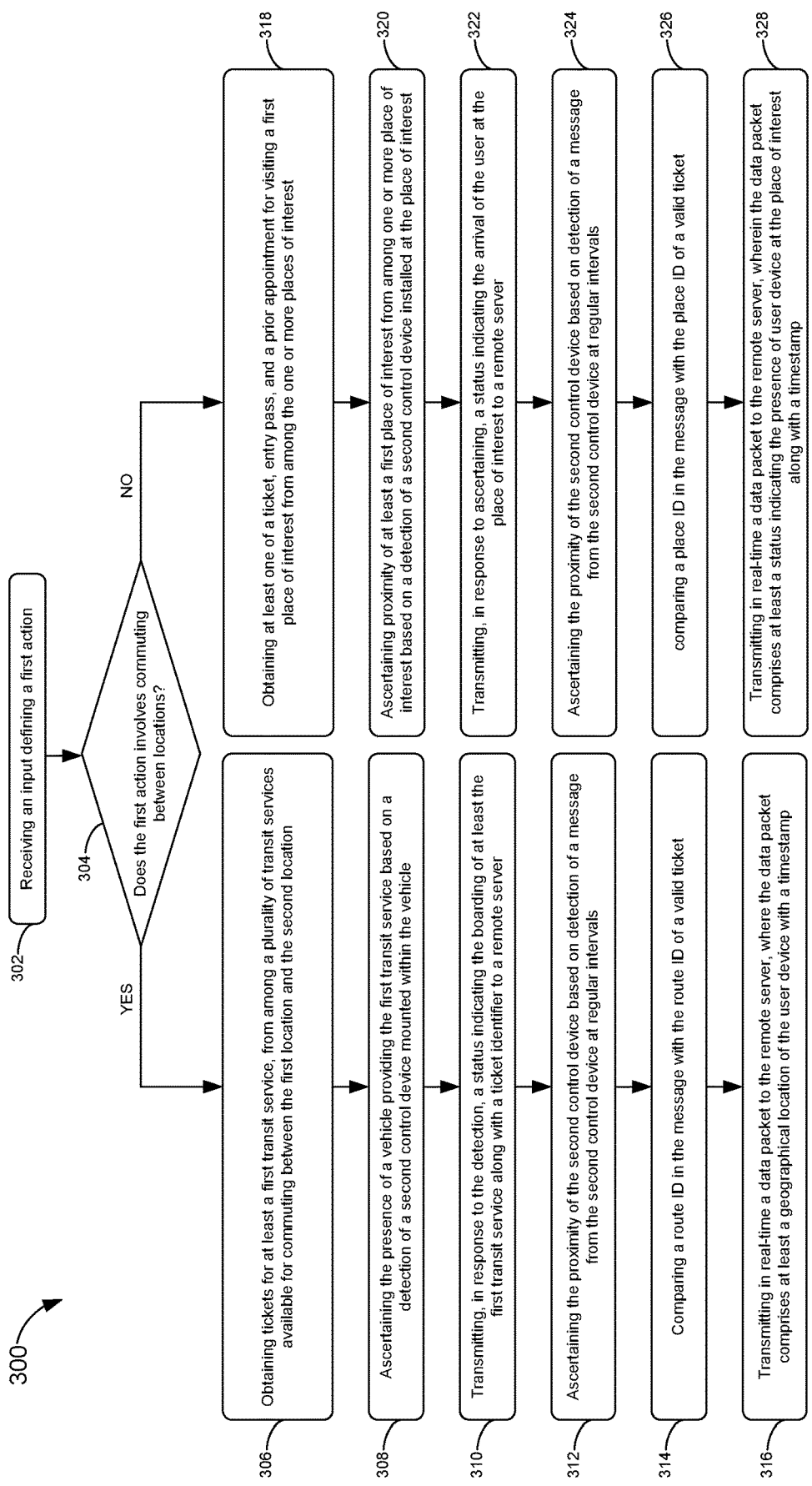
FIG. 3 illustrates a method for rendering digitized services, in accordance with an example implementation of present subject matter.
Figure 4:
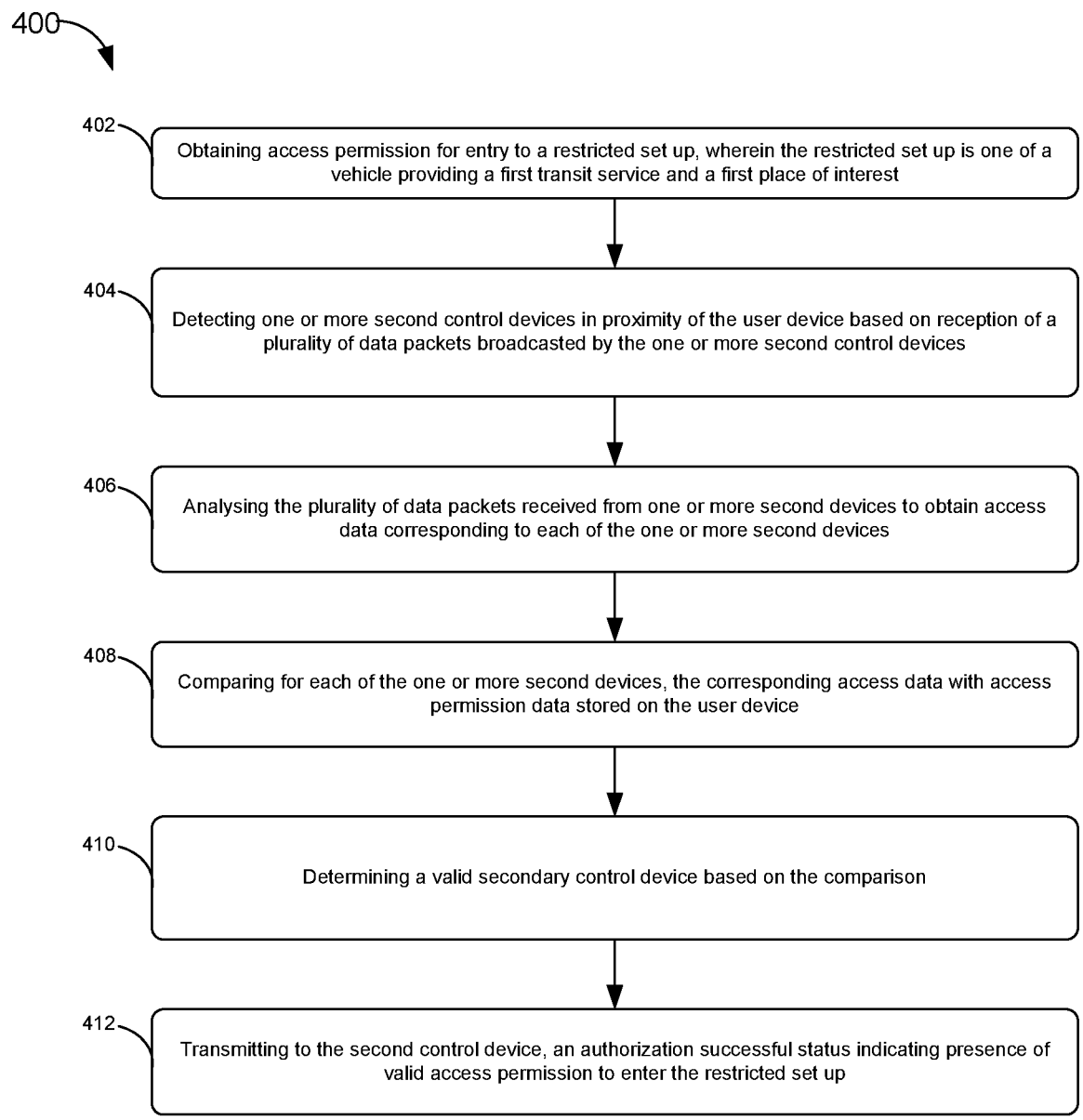
FIG. 4 illustrates a method for managing access to a restricted setup, in accordance with an example implementation of present subject matter.

FIGS. 3-4 illustrate example methods 300 and 400, respectively, for rendering digitized services in a smart environment. The order in which the methods are described is not intended to be construed as a limitation, and any number of the described method blocks may be combined in any order to implement the methods, or an alternative method. Furthermore, methods 300 and 400 may be implemented by processing resource or computing device(s) through any suitable hardware, non-transitory machine-readable instructions, or combination thereof.

It may also be understood that methods 300 and 400 may be performed by programmed computing devices, such as system 100, which may include user devices 102, second control devices 112, and remote server 106 as depicted in FIGS. 1-2. Furthermore, the methods 300 and 400 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 300 and 400 are described below with reference to user devices 102, second control device 112, and remote server 106 as described above; other suitable systems for the execution of these methods may also be utilized. Additionally, implementation of these methods is not limited to such examples.

The method starts at block 302. At block 302, an input defining a first action is received from a user. The input may be received by an interface of the user device, such as interface 204 of the user device 102.

At block 304, it is determined whether a first action involves commuting between two locations, say, a first location and a second location. In an example, the first action may be identified based on a user input or a user schedule, by an identification module of a user device, such as the identification module 208 of the user device 102. If in case it is determined that the first action involves commuting between two locations, ('Yes' path from block 304), the method proceeds to block 306.

At block 306, tickets are obtained for at least a first transport service, from among a plurality of transport services available for commuting between the first location and the second location. In one example, the ticket includes a ticket identifier indicating at least a ticket number and a route ID for commuting between the first location and the second location using the first transport service. In an example, tickets for the first transport service may be obtained by a ticketing module of the user device, such as a ticketing module 210 of the user device 102.

At block 308, the presence of a vehicle providing the first transport service is ascertained based on a detection of a second control device mounted within the vehicle. In an example, the presence of the vehicle providing the first transport service may be ascertained by a validation module of the user device, such as the validation module 212 of the user device 102, based on a detection of a second control device, such as the second control device 112 mounted within the vehicle.

At block 310, in response to detection, the user device transmits a status indicating the boarding of at least the first transport service along with a ticket identifier to a remote server. In an example, a tracking module of the user device, such as tracking module 214 of the user device 102, may transmit the status indicating the boarding of at least the first transport service along with the ticket identifier to the remote server 106.

At block 312, the proximity of the second control device is ascertained based on detection of a message from the second control device at regular intervals, where the message comprises at least the route ID. In an example, the proximity of the second control device 112 may be ascertained by the tracking module 214 of the user device 102.

At block 314, the route ID in the message is compared with the route ID of a valid ticket. In an example, the route ID in the message may be compared with the route ID of the valid ticket by the tracking module 214 of the user device 102.

Finally, at block 316, a data packet is transmitted in real-time to the remote server, where the data packet comprises at least the geographical location of the user device along with a timestamp. In an example, the data packet is transmitted by the tracking module 214 of the user device 102 to the remote server 106.

If at block 304, it is determined that the first action does not involve commuting between the two locations at least one of a ticket, entry pass, and a prior appointment is obtained at block 318. In one example, the ticket, entry pass, or the prior appointment may be obtained for visiting a first place of interest from among the one or more places of interest. In an example, the ticketing module 210 of the user device 102 may obtain at least one of a ticket, entry pass, and a prior appointment for visiting a first place of interest from among the one or more places of interest. The method, thereafter, proceeds to block 320.

At block 320, the proximity of at least a first place of interest from among one or more place of interest is ascertained based on the detection of a second control device installed at the place of interest. In an example, the proximity of the first place of interest may be ascertained by the validation module 212 of the user device 102, based on the detection of a second control device 112 installed at the place of interest.

At block 322, in response to ascertaining, a status indicating the arrival of the user at the place of interest is transmitted to the remote server. In an example, the validation module 212 of the user device 102 may transmit a status indicating the arrival of the user at the place of interest to the remote server 106.

At block 324, the proximity of the second control device is ascertained based on detection of a message from the second control device at regular intervals, where the message comprises at least the place ID. In an example, the tracking module 214 of the user device 102 may ascertain the proximity of the second control device 112 based on detection of the message from the second control device 112.

At block 326, the place ID in the message is compared with the place ID of a valid ticket. In an example, the place ID in the message may be compared with the place ID of the valid ticket by the tracking module 214 of the user device 102.

Finally, at block 328, a data packet is transmitted in real-time to the remote server, where the data packet comprises at least a status indicating the presence of the user device at the place of interest with a timestamp. In an example, the data packet is transmitted by the tracking module 214 of the user device 102 to the remote server 106.

FIG. 4 illustrates a method 400 for managing access to a restricted setup, in accordance with an example implementation of the present subject matter.

At block 402, an access permission for entry to a restricted set up is obtained, where the restricted set up is one of a vehicle providing a first transport service and a first place of interest. In an example, the access permission may be obtained by a ticketing module of a user device, such as the ticketing module 210 of the user device 102.

At block 404, the second control devices in proximity of the user device may be detected based on reception of a plurality of data packets broadcasted by the second control devices, where the second control devices are present within one or more restricted set up in proximity to the user device. In an example, a validation module of the user device, such as the validation module 212 of the user device 102 may detect the second control devices 112 based on reception of the plurality of data packets broadcasted by the second control devices 112. The method, thereafter proceeds to block 406.

At block 406, the plurality of data packets received from one or more second devices are analysed to obtain access data corresponding to each of the second control devices, where the access data comprises a second control device Id and one of a place Id and route Id. In an example, the validation module 212 of the user device 102 may analyse the plurality of data packets to obtain access data 232 corresponding to each of the one or more second devices 112. The method, thereafter, proceeds to block 408.

At block 408, the access corresponding to each of the second control devices is compared with access permission data stored on the user device, where the access permission data comprises one of a route ID and place ID. In an example, the validation module 212 of the user device 102 may compare the access data 232 corresponding to each of the second control device 112 with access permission data stored on the user device 102.

At block 410, a valid second control device is determined based on the comparison, where the valid second control device is present within the restricted set up for which the user device has the access permission. In an example, a valid second device 112 may be determined by the validation module 212 of the user device 102.

Finally, at block 412, an authorization successful status indicating presence of valid access permission to enter the restricted set up is transmitted to the second control device. In an example, the validation module 212 of the user device 102 may transmit the authorization successful status indicating presence of valid access permission to enter the restricted set up to the second control device 112.

Figure 5:
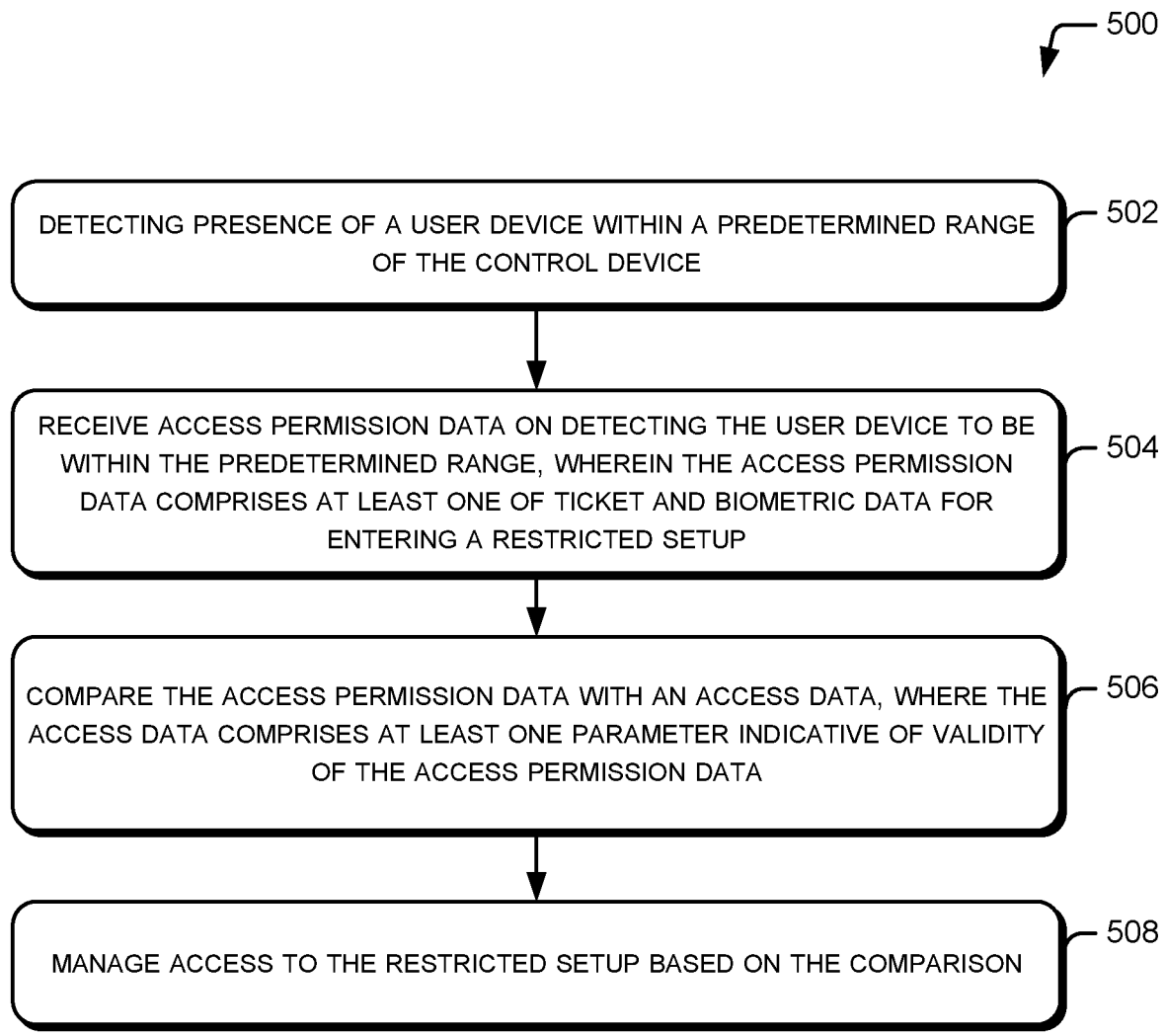
FIG. 5 illustrates a method for managing access to the restricted setup, in accordance with another example implementation of the present subject matter.

FIG. 5 illustrates a method for managing access to the restricted setup, in accordance with an example of the present subject matter. The order in which the methods are described is not intended to be construed as a limitation, and any number of the described method blocks may be combined in any order to implement the methods, or an alternative method. Furthermore, method 500 may be implemented by processing resource or computing device(s) through any suitable hardware, non-transitory machine-readable instructions, or combination thereof.

It may also be understood that method 500 may be performed by programmed computing devices, such as control device 112, which may include depicted in FIGS. 1-2. Furthermore, the method 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The method 500 are described below with reference to control device as described above; other suitable systems for the execution of these methods may also be utilized. Additionally, implementation of these methods is not limited to such examples.

At block 502, presence of a user device within a predetermined range of the control device may be detected. The presence of the user device 102 within the predetermined range of the control device may be detected based on different communication technologies, such as Wi-fi, Bluetooth, Near Field Communication (NFC), and Radio frequency identification (RFID).

In an example, the predetermined range within which the control device is detected may be configured based on a number of factors, such as size of the restricted setup, area of the restricted setup, size of an entry point of the restricted setup, and size of an exit point of the restricted setup. As explained previously, the control device may be configured to have different ranges for its detection by user devices based on an application wherein the control device is implemented. For instance, when the control device is implemented in a restricted setup which is a vehicle, the predetermined range of the control device 104 may be configured to be about 3 feet. On the other hand, when the control device is implemented to manage access to a restricted premises, such as an office, hospital, mall, and theatre, the predetermined range of the control device 104 may be configured to be about 20 feet for instance, based on a size of the entry point of the restricted premises. Further, the predetermined range of the control device 104 may be configured to be more than 1 inch and less than 5 feet for the entry point of the restricted setup. Moreover, the predetermined range of the control device 104 may be configured to be more than 5 feet and less than 100 feet for the exit point of the restricted setup.

In an example, presence of the user device within the predetermined range of the control device may be detected by an access module 230 of the control device 104. Further, the predetermined range of the control device may also be configured by the access module 230.

At block 504, on detecting the user device to be within the predetermined range, access permission data may be received. The access permission data may include at least one of ticket and biometric data for entering the restricted setup. In an example, along with the access permission data, user identification information may also be received. The user identification information may include, but is not limited to, name, age, gender, and other identification credentials of the user. In the example, along with validation of the access permission data, user identification information may also be assessed to determine whether the user fulfills other eligibility criteria for accessing the restricted setup. For instance, when an event is adult only, a user who might be having a valid ticket but is not a major may not be allowed entry to the event. In an example, access permission data and the user identification information may be received by the access module 230.

At block 506, the access permission data may be compared with an access data to ascertain validity of the access permission data. In an example, the access data comprises at least one parameter indicative of validity of the access permission data. For instance, when the access permission data is a ticket, the at least one parameter may be a ticket identifier. Similarly, when the access permission data is biometric data, the at least one parameter may be a hash value of the biometric data. In the example, the access permission data may be compared with the access data by the access module 230.

At block 508, access to the restricted setup may be managed based on the comparison. For instance, if it is determined that the access data includes a ticket identifier and/or hash value corresponding to the access permission data received from the user device 102, access to the restricted setup may be allowed. Conversely, access to the restricted setup may be denied and a notification indicating absence of a valid permission for the user device 102 may be generated. In an example, access to the restricted setup may be managed by the access module 230.

In an example, based on the allowance/denial of access to the restricted setup, a count of user devices present within the restricted setup may also be maintained. In the example, the count of the user devices present within the restricted setup may be kept by counting a number of user devices for which validation of access permission data is performed while entering the restricted setup. The count may further be updated every time a user device present within the restricted setup leaves the restricted setup. The exiting of the user device may be determined based on the validation of the access permission data at the exit point of the restricted setup or by determining that the user device has moved outside the predetermined range of the control device, for example. In this manner, a virtual queue to the restricted setup may be maintained which may be updated every time user devices enter and exit the restricted setup. In an example, the virtual queue may help to identify the user devices that are allowed to enter the restricted setup and schedule their entry. For instance, if the virtual queue indicates that the restricted setup has already reached its threshold capacity, any more user devices may not be allowed to enter the restricted setup until the number of user devices present within the restricted setup are less than the threshold capacity.

In another example, managing access to the restricted setup may further include managing an order placed at the restricted setup. For instance, when a user visits an amusement park, the access permission data received from the user device may initially be validated at the entry point of the amusement park. Further, as already explained above, various control device installed at the different rides and food stall etc. within the amusement park, may further manage user's access to the restricted setup.

For instance, the user may purchase a food item from the user device and may receive an order number for his order. As the user approaches the food stall to collect his order, the presence of the user device may be detected by a control device installed at the food stall and the user's order may be made available to him for collection. This avoids the need for the user to interact with a vendor at the food stall and share the order details manually, thereby making the process more efficient. Various other implementations similar to the present example where the food stall is the restricted setup and the control device and the user device interact to manage the user's order, are also possible.

In various examples, purchase of a variety of merchandise or collection of a variety of deliverables ordered by the user at a restricted setup may be affected based on implementation of control device and user device in a manner explained above. In some implementations, access to a restricted setup, for example, for collection of a deliverable may be managed by interaction of control device and user device to verify order details pertaining to the deliverable. In such example implementation, access permission data may comprise order details.

Although examples for the present disclosure have been described in language specific to structural features and/or methods, it would be understood that the appended claims are not necessarily limited to the specific features described. Rather, the specific features and methods are disclosed and explained as examples of the present disclosure.

I claim:

1. A control device installed at a restricted setup, wherein the control device is to wirelessly communicate with a user device to manage access of a user of the user device to the restricted setup, the control device comprising: an access module to wirelessly communicate with the user device to: detect presence of the user device within a predetermined range of the control device; receive access permission data on detecting the user device to be within the predetermined range, wherein the access permission data comprises at least one of ticket and biometric data for entering the restricted setup; compare the access permission data with an access data, wherein the access data comprises at least one parameter indicative of validity of the access permission data, and wherein the at least one parameter is received at the control device in response to the user obtaining the access permission data for entering the restricted setup; and manage access to the restricted setup based on the comparison.

2. The control device as claimed in claim 1, further comprising a range configuration module to configure the predetermined range of the control device within which the control device is to detect the user device.

3. The control device as claimed in claim 2, wherein the range configuration module is to configure the predetermined range of the control device based on at least one of size and area of the restricted setup.

4. The control device as claimed in claim 2, wherein the range configuration module is to configure the predetermined range of the control device based on a size of one of entry point and exit point of the restricted setup.

5. The control device as claimed in claim 2, wherein the restricted setup is a vehicle and the range configuration module is to configure the predetermined range of the control device to be about 3 feet.

6. The control device as claimed in claim 2, wherein the restricted setup is a restricted premises and the range configuration module is to configure the predetermined range of the control device to be about 20 feet.

7. The control device as claimed in claim 4, wherein the range configuration module is to configure the predetermined range of the control device to be more than 1 inch and less than 5 feet for the entry point of the restricted setup, and wherein the range configuration module is to configure the predetermined range of the control device to be more than 5 feet and less than 100 feet for the exit point of the restricted setup.

8. The control device as claimed in claim 1, wherein the access module is to further manage an order of a purchase made by the user at the restricted setup.

9. The control device as claimed in claim 1, further comprises a card reader module to manage access to the restricted setup by scanning of NFC based access cards.

10. The control device as claimed in claim 1, wherein the access module is further to count a number of user devices entering the restricted setup and a number of user devices exiting the restricted setup, wherein to manage access to the restricted setup, the access module is to manage a virtual queue pertaining to the restricted setup based on the count.

11. The control device as claimed in claim 1, wherein the access module is further to receive user identification information of the user and wherein the access module is to manage access to the restricted setup based on the user identification information.

12. A method of managing access of a user of a user device to a restricted setup, the method comprising: detecting, by a control device installed at the restricted setup, presence of a user device within a predetermined range of the control device, wherein the control device is to wirelessly communicate with the user device; receiving, by the control device, access permission data from the user device on detecting the user device to be within the predetermined range, wherein the access permission data comprises at least one of ticket and biometric data for entering the restricted setup; comparing the access permission data with an access data, wherein the access data comprises at least one parameter indicative of validity of the access permission data, and wherein the at least one parameter is received at the control device in response to the user obtaining the access permission data for entering the restricted setup; and managing access to the restricted setup based on the comparison.

13. The method as claimed in claim 12, further comprising configuring the predetermined range of the control device within which the control device is to detect the user device.

14. The method as claimed in claim 12, wherein configuring the predetermined range of the control device is based on at least one of size and area of the restricted setup.

15. The method as claimed in claim 12, wherein configuring the predetermined range of the control device is based on a size of an entry point of the restricted setup.

16. The method as claimed in claim 12, wherein the restricted setup is a vehicle, and wherein the method comprises configuring the predetermined range of the control device to be about 3 feet.

17. The method as claimed in claim 12, wherein the restricted setup is a restricted premises, and wherein the method comprises configuring the predetermined range of the control device to be about 20 feet.

18. The method as claimed in claim 12, wherein managing access to the restricted setup comprises managing an order of a purchase made by the user at the restricted setup.

19. The method as claimed in claim 12, wherein the method further comprises configuring the predetermined range of the control device to be more than 5 feet and less than 15 feet for an exit point of the restricted setup.

20. The method as claimed in claim 12, further comprising: counting a number of user devices entering the restricted setup and a number of user devices exiting the restricted setup; and managing a virtual queue pertaining to the restricted setup based on the counting.

21. The method as claimed in claim 12, further comprising receiving user identification information of the user and managing access to the restricted setup based on the user identification information.

* * * * *